United States Patent
Montemurro et al.

(10) Patent No.: US 12,108,491 B2
(45) Date of Patent: Oct. 1, 2024

(54) MULTIPLE LINK LAYER ADDRESSES FOR A DEVICE

(71) Applicant: BlackBerry Limited, Waterloo (CA)

(72) Inventors: Michael Peter Montemurro, Toronto (CA); James Randolph Winter Lepp, Ottawa (CA); Stephen McCann, Southampton (GB)

(73) Assignee: BlackBerry Limited, Waterloo (CA)

( * ) Notice: Subject to any disclaimer, the term of this patent is extended or adjusted under 35 U.S.C. 154(b) by 448 days.

(21) Appl. No.: 17/446,838

(22) Filed: Sep. 3, 2021

(65) Prior Publication Data
US 2022/0086627 A1 Mar. 17, 2022

Related U.S. Application Data

(60) Provisional application No. 63/076,967, filed on Sep. 11, 2020.

(51) Int. Cl.
| | |
|---|---|
| *H04W 8/26* | (2009.01) |
| *H04L 61/5076* | (2022.01) |
| *H04W 76/15* | (2018.01) |
| *H04L 101/622* | (2022.01) |
| *H04W 84/12* | (2009.01) |

(52) U.S. Cl.
CPC ............ *H04W 8/26* (2013.01); *H04L 61/5076* (2022.05); *H04W 76/15* (2018.02); *H04L 2101/622* (2022.05); *H04W 84/12* (2013.01)

(58) Field of Classification Search
CPC ....... H04W 8/25; H04W 76/15; H04W 84/12; H04L 61/5076; H04L 2101/622
See application file for complete search history.

(56) References Cited

U.S. PATENT DOCUMENTS

| | | | | |
|---|---|---|---|---|
| 7,809,354 | B2 * | 10/2010 | Calhoun | H04L 63/126 |
| | | | | 455/410 |
| 2002/0024950 | A1 * | 2/2002 | Fink | H04L 61/50 |
| | | | | 370/389 |
| 2004/0100922 | A1 * | 5/2004 | Yegin | H04L 61/00 |
| | | | | 370/328 |
| 2011/0228755 | A1 | 9/2011 | Seok | |
| 2016/0135041 | A1 | 5/2016 | Lee et al. | |
| 2016/0269359 | A1 | 9/2016 | Adrangi et al. | |

FOREIGN PATENT DOCUMENTS

EP 1732265 B1 10/2010

OTHER PUBLICATIONS

IEEE, MAC Privacy protection, Individual Contribution—Media Access control (MAC) Security—Amendment MAC Privacy protection, Feb. 5, 2020, pp. 17-21.
European Patent Office, Extended European Search Report for Appl. No. 21196235.2 dated Dec. 21, 2021 (7 pages).

(Continued)

*Primary Examiner* — Duc C Ho
(74) *Attorney, Agent, or Firm* — Trop Pruner & Hu, P.C.

(57) ABSTRACT

A device includes a link layer configured to use a first link layer address and a second link layer address, maintain the first link layer address unchanged for a duration of an association of the device with a wireless network, and change the second link layer address from a first value to a second value during the duration.

25 Claims, 3 Drawing Sheets

(56) References Cited

OTHER PUBLICATIONS

Canadian Patent Office, Office Action for Appl. No. 3,130,050 dated Oct. 16, 2023 (4 pages).
Duncan Ho et al., MLA MAC Addresses Considerations, IEEE 802.11-19/1899r7, Jan. 2020 (16 pages).
Jerome Henry, IEEE P802.11, Wireless LANs, RCM—A PAR Proposal, IEEE 802.11-20-0742-01-0rcm, May 2020 (4 pages).
Po-Kai Huang et al., Multi-link Setup Follow Up II, IEEE 802.11-20/0387r3, Mar. 9, 2020 (16 pages).
Amelia Andersdotter et al., IEEE P802.11 Wireless LANs, IEEE 802.11 Randomized and Changing MAC Addresses Topic Interest Group Report, Nov. 2019 (13 pages).
European Patent Office, Communication pursuant to Article 94(3) EPC for Appl. No. 21196235.2 dated Oct. 18, 2022 (5 pages).
European Patent Office, Decision to refuse a European patent application for Appl. No. 21196235.2 dated Feb. 20, 2024 (12 pages).
European Patent Office, Extended European Search Report for Appl. No. 24170900.5 dated May 27, 2024 (8 pages).
Canadian Patent Office, Office Action for Appl. No. 3,130,050 dated Aug. 8, 2024 (4 pages).
Publication: "IEEE Std 802.11i™-2004—IEEE Standard for Information technology-Telecommunications and information exchange between systems—Local and metropolitan area networks—Specific requirements—Part 11: Wireless LAN Meduim Access Control (MAC) and Physical Layer (PHY) specifications—Amendment 6: Medium Access Control (MAC) Security Enhancements"—IEEE Computer Society—pp. 1 to 80—Jul. 2004.
Publication: "IEEE Std 802.11i™-2004—IEEE Standard for Information technology-Telecommunications and information exchange between systems—Local and metropolitan area networks—Specific requirements—Part 11: Wireless LAN Meduim Access Control (MAC) and Physical Layer (PHY) specifications—Amendment 6: Medium Access Control (MAC) Security Enhancements"—IEEE Computer Society—pp. 81 to 175—Jul. 2004.

\* cited by examiner

MULTIPLE LINK LAYER ADDRESSES FOR A DEVICE

CROSS REFERENCE TO RELATED APPLICATION

This application claims the benefit under 35 U.S.C. § 119(e) of U.S. Provisional Application Ser. No. 63/076,967, filed Sep. 11, 2020, which is hereby incorporated by reference.

BACKGROUND

Electronic devices can communicate over wired or wireless networks. An example of a network includes a local area network (LAN), which is a network that allow devices in a specific area (physical area or logical area) to communicate with one another. Devices without appropriate credentials or permissions would not be able to connect to the LAN.

A LAN can include a wired LAN or a wireless LAN. A wireless LAN (WLAN) includes wireless access points (APs) to which devices are able to wirelessly connect.

BRIEF DESCRIPTION OF THE DRAWINGS

Some implementations of the present disclosure are described with respect to the following figures.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

1. Background, Acronyms and Abbreviations

Table 1 below lists various acronyms and abbreviations

TABLE 1

| Acronym/Abbreviation | Full text | Brief Description |
|---|---|---|
| AP | Access Point | An infrastructure IEEE 802.11 (WLAN) wireless device that terminates the air interface, allowing traffic to flow in and out of the infrastructure. |

TABLE 1-continued

| Acronym/Abbreviation | Full text | Brief Description |
|---|---|---|
| IP | Internet Protocol | |
| LAN | Local Area Network | |
| MAC | Media Access Control | Layer 2 of the OSI stack. Also used for MAC address which is a 48 bit identifier in 802.3 and 802.11 networks |
| STA | Station | An IEEE 802.11 (WLAN) wireless device. This can be either a mobile device or an access point. |
| WLAN | Wireless Local Area Network | |
| EHT | Extremely High Throughput | The name of the IEEE 802.11be amendment |
| PHY | Physical layer | Layer 1 of the OSI stack |
| MLD | Multi-link device | A type of device defined in 802.11be that supports more than one simultaneous radio link. Logically it is a device with more than one STA in it. |
| RCM | Random and Changing MAC addresses | Name of the study group in IEEE 802.11 |
| ESS | Extended Service Set | A WLAN including more than one AP. This configuration allows mobility between APs while remaining connected to the network |
| DHCP | Dynamic Host Configuration Protocol | Method of assigning layer 3 IP addresses on a LAN |
| ARP | Address Resolution Protocol | The binding between layer 2 addresses (MAC addresses) and layer 3 addresses (IPv4 addresses) |
| PMK | Pairwise Master Key | As defined in IEEE 802.11 |
| PTK | Pairwise Transient Key | As defined in IEEE 802.11 |
| PTKSA | pairwise transient key security association | As defined in IEEE 802.11 |
| RSNA | robust security network association | As defined in IEEE 802.11 |
| SAE | Simultaneous authentication of equals | As defined in IEEE 802.11 |
| FT | fast basic service set (BSS) transition | As defined in IEEE 802.11 |
| FILS | fast initial link setup | As defined in IEEE 802.11 |
| KDE | key data encapsulation | As defined in IEEE 802.11 |
| TDLS | tunneled direct-link setup | As defined in IEEE 802.11 |

Table 2 below lists various terms used and corresponding brief descriptions of the terms.

TABLE 2

| Term | Brief Description |
|---|---|
| IP address | A unique identifier assigned to a network entity by the Internet Protocol (IP). This is typically unique for a network segment. |
| MAC address | A unique identifier assigned to a network entity for network communications. This is typically universally unique. |
| LAN MAC | A MAC addressed used in addressing a station or device on the LAN and/or WLAN |
| AIR MAC | A MAC address used in the source address (SA) or destination address (DA) |
| LINK Address | IEEE 802.11be proposed address to identify an individual link in a multi-link device. |

TABLE 2-continued

| Term | Brief Description |
| --- | --- |
| MLD Address | IEEE 802.11be proposed address to identify that whole device in a multi-link device |
| LAN MAC protection | Term used for the proposal in this paper. Alternative names could be MAC Address Privacy, LAN MAC Privacy, Temporary MAC addressing, etc. |
| Proxy ARP | The Proxy ARP service enables an AP to respond to ARP and Neighbor Discovery frames on behalf of associated non-AP STAs |
| SA Query frame | security association query frame |

2. Issues

2.1 General

A device operating in a local area network (LAN) uses its Media Access Control (MAC) address as a source address for frames transmitted and received over the LAN. The LAN uses the device's MAC address to route LAN traffic to the correct device on the LAN. Furthermore, the device's MAC address is used to maintain other state information such as an IP address. If a device changes its MAC address, both LAN and IP communications are interrupted. The device has to detach and re-attach to the LAN to re-establish state information, which can interrupt any application-level communications.

2.2 User Privacy

Devices operating on a LAN can be assigned a globally unique MAC address. Traditionally devices have used the globally unique MAC address as their address when operating in a LAN. With user privacy becoming more important, some devices now assign their MAC addresses to randomly derived addresses in the locally administered address space for communications. A randomly derived address is used to communicate with other devices while performing discovery procedures and while connecting and operating on a LAN.

There are conflicting behavioral requirements for a device between LAN communications and preservation of privacy. An example of conflicting behavioral requirements includes use of a MAC address for a security keying algorithm (that generates security keys based on the MAC address) that runs for the duration of the association with the LAN, and privacy enhancement based on changing the MAC address more often to thwart tracking by passive observers. A solution should be developed to address the conflicting behavioral requirements.

3. Example Implementations

Figure 1:
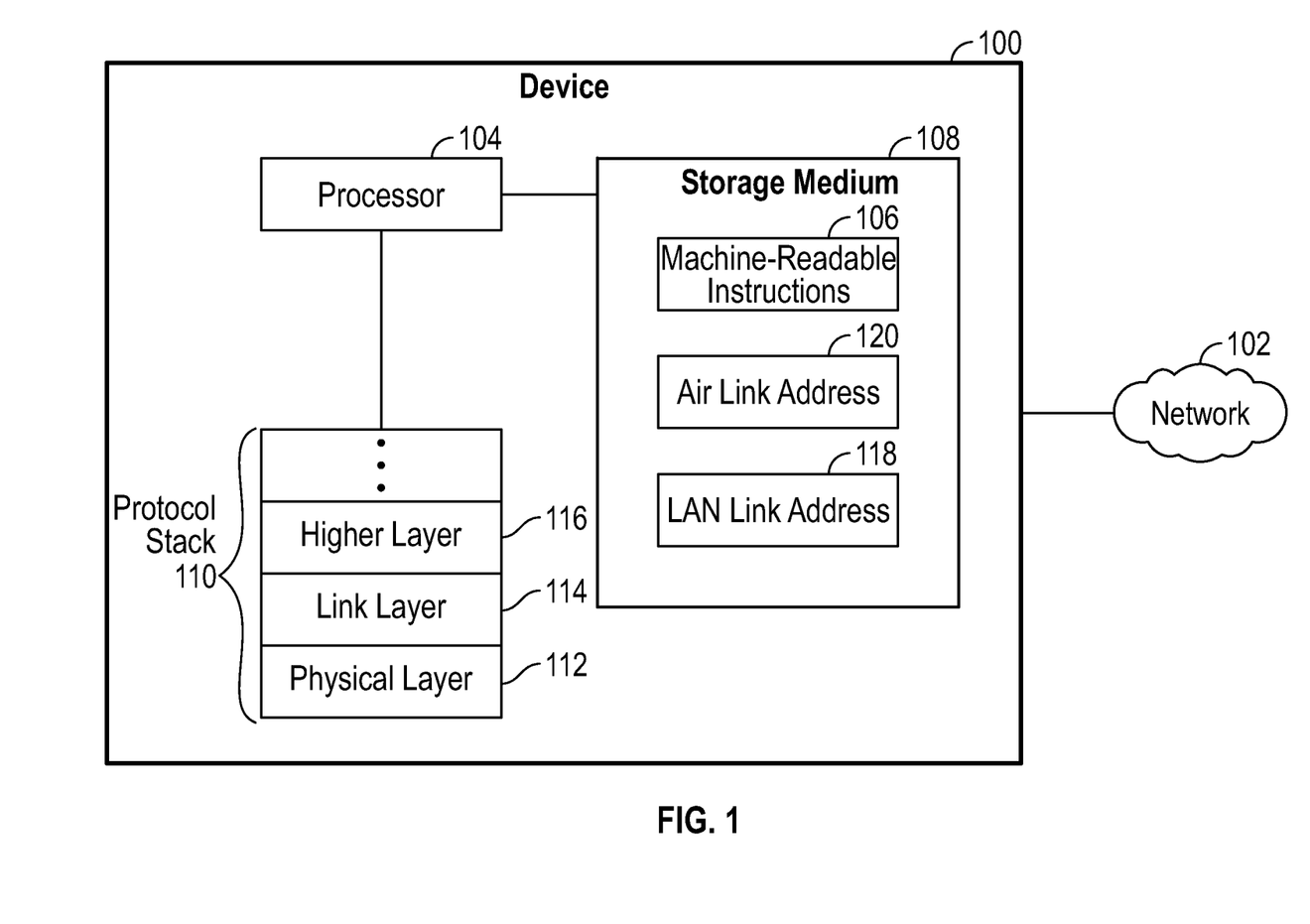
FIG. 1 is a block diagram of a device according to some implementations of the present disclosure.

FIG. 1 shows a device 100 that is capable of communications over a network 102, such as a wired LAN or a wireless LAN (WLAN). Examples of devices can include any or some combination of the following: a desktop computer, a notebook computer, a tablet computer, a smartphone, an Internet-of-things (IOT) device, a vehicle, a controller in a vehicle, a game appliance, a household appliance, and so forth.

The device 100 includes one or more hardware processors 104 that are able to execute machine-readable instructions 106 stored in a non-transitory machine-readable or computer-readable storage medium 108. A hardware processor can include a microprocessor, a core of a multi-core microprocessor, a microcontroller, a programmable integrated circuit, a programmable gate array, or another hardware processing circuit.

The storage medium 108 can be implemented using one or more storage devices. A storage device can include a volatile memory device or a non-volatile memory device. Another example of a storage device can include a persistent storage device such as a disk-based storage device, a solid-state drive, and so forth.

The device 100 further includes a protocol stack 110 that includes various layers to allow communications between the device 100 and the network 102.

In some examples, the network 102 is a wireless network, such as a WLAN, a cellular network, and so forth. In other examples, the network 102 (or another network) can include a wired network, such as a LAN. Although just one network 102 is depicted, it is noted that there can be multiple networks with which the device 100 can communicate, where the networks can include a wireless network and a wired network. For example, the device 100 can communicate with a WLAN, as well as with a wired LAN.

The layers of the protocol stack 110 include a physical layer 112, which includes physical circuitry (including a transceiver) to transmit and receive signals over the network 102. The protocol stack 110 also includes a link layer 114 above the physical layer 112. In some examples, the link layer 114 includes a Media Access Control (MAC) layer.

The protocol stack 110 further includes one or more higher layers 116 above the link layer 114. Examples of higher layers 116 can include any or some combination of the following: an IP layer, a security protocol layer, and so forth.

Note that the higher layer(s) 116 and possibly the link layer 114 can be implemented as machine-readable instructions executable by the one or more hardware processors 104. In further examples, the link layer 114 (and possibly one or more of the higher layer(s) 116) can be implemented using hardware processing circuitry.

In accordance with some implementations of the present disclosure, the link layer 114 is able to use multiple link layer addresses (e.g., multiple MAC addresses) for communications to or from the device 100. The multiple link layer addresses include a first link layer address that is maintained unchanged for a duration of an association of the device 100 with a wireless network. The multiple link layer addresses further include a second link layer address that changes from a first value to a second value (and possibly to further other values) during the duration of the association of the device 100 with the wireless network.

In some examples, the first link layer address that is unchanged for the duration of the association with the wireless network is referred to as a LAN link address 118. The second link layer address that can be changed during the duration of the association of the device 100 with the wireless network is referred to as an air link address 120. The LAN link address 118 and the air link address 120 can be stored in the storage medium 108 (e.g., a memory) for use in communications of the device 100.

3.1 Implementation 1: LAN MAC Protection

In accordance with some implementations, a feature that supports use of multiple link layer addresses for communications by a specific device (e.g., 100) is referred to as a LAN MAC protection feature. In other examples, this feature can also be referred to as LAN MAC Privacy, MAC address rotation, AIR MAC Change Protocol, and so forth.

More generally, the feature is referred to as a link layer address protection feature.

Figure 2:
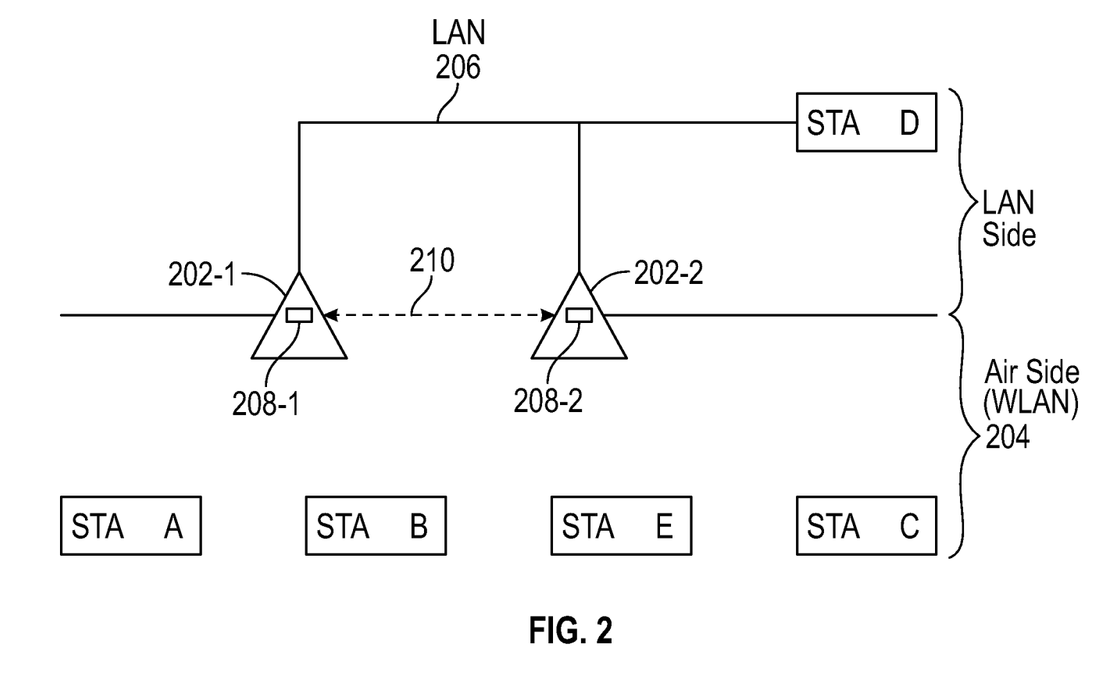
FIG. 2 is a block diagram of an example arrangement including access points (APs) and stations (STAs) according to some implementations of the present disclosure.

FIG. 2 shows an example arrangement that includes access points (APs) 202-1 and 202-2, which are wireless access network nodes in a WLAN to which wireless devices (referred to as stations or STAs) can establish wireless connections. An AP can also be referred to as a STA. A wireless device that is not an AP is referred to as a non-AP STA.

FIG. 2 shows a number of STAs (A, B, C, D, and E) that are able to communicate with the APs 202-1 and 202-2. The STAs A, B, C, and E are wireless devices that are able to communicate wirelessly with the APs 202-1 and 202-2 in the WLAN 204. The STA D is a wired device connected over a wired LAN 206 to the APs 202-1 and 202-2.

The WLAN 204 is considered to be the air side, in which STAs communicate over the air (wirelessly) with the AP 202-1 or 202-2. The wired LAN 206 is part of the LAN side, in which STAs communicate over a wired communication medium with an AP 202-1 or 202-2.

In the example of FIG. 2, the STAs A, B, and C support the LAN MAC protection feature, and the STA E is a legacy device that does not support the LAN MAC protection feature. A STA that supports the LAN MAC protection feature can be referred to as a "LAN MAC protected STA" in the ensuing discussion.

A LAN MAC protected STA (any of STAs A, B, and C) can use the LAN MAC protection feature to interoperate with legacy devices (e.g., STA E) using a single, static MAC address (e.g., the LAN link address 118 of FIG. 1).

The AP 202-1 or 202-2 in the WLAN 204 advertises support for the LAN MAC protection feature using messages or information elements transmitted by the AP, such as in beacons, probe response frames, and so forth. For example, support for the LAN MAC protection feature can be specified by advertising in a LAN MAC Protection element (e.g., a LAN MAC Protection bit) in an Extended Capabilities Element of a frame communicated over the air. More generally, an AP can include a link layer (including a hardware processing circuit in some examples or machine-readable instructions in other examples) configured to transmit, over a wireless network (e.g., the WLAN 204) to a device (any of STA A, B, or C), an indication of support for a link layer address protection feature that provides multiple link layer addresses, the multiple link layer addresses including a first link layer address to be maintained unchanged for a duration of an association between the device and the AP, and a second link layer address to be varied to different values during the duration.

The link layer 114 of the device 100 is configured to detect, in information (e.g., messages or information elements) transmitted by an AP in the WLAN 204, that the AP supports a link layer address protection feature that provides for use of different link layer addresses by the device 100. The link layer 114 is configured to send an indication to the AP to request information regarding whether the AP supports the link layer address protection feature.

In some examples, a LAN MAC protected STA can request use of the LAN MAC protection feature by including the LAN MAC Protection element or by setting a LAN MAC Address Privacy indicator in a (re-)association request frame.

The LAN MAC protected STAs A, B, and C maintain two MAC addresses: a LAN MAC address that does not change for a duration of an association of the respective STA with an AP, and an AIR MAC address that can change during the duration. The AIR MAC address is used in frames transmitted between a LAN MAC protected STA and the AP. A LAN MAC address is used to forward frames destined for the wired LAN 206. Each LAN MAC protected STA A, B, or C maintains its respective LAN MAC address for the duration of the STA's association to an AP in an ESS. Each LAN MAC protected STA A, B, or C maintains its AIR MAC address according to the STA's policy for MAC address rotation/changing.

The AP (202-1 or 202-2) manages address resolution for LAN MAC protected STAs (in which the LAN MAC protection has been enabled). Each LAN MAC protected STA A, B, or C can use Proxy ARP for address resolution. The STA D on the wired LAN 206 can also use Proxy ARP for address resolution.

The AP (202-1 or 202-2) responds to an ARP request from the STA on the LAN side (STA D) with the LAN MAC address for STA D. The AP (202-1 or 202-2) responds to an ARP request from an air side LAN MAC protected STA A, B, or C further with an AIR MAC address for the STA A, B, or C (i.e., the AP responds to the ARP request from the air side LAN MAC protected STA with both the LAN MAC address and the AIR MAC address for the STA).

As further shown in FIG. 2, each AP 202-1 or 202-2 includes a respective LAN MAC-AIR MAC mapping table (or mapping information of another format) 208-1 or 208-2, respectively. Each LAN MAC-AIR MAC mapping table 208-1 or 208-2 includes multiple entries, where each entry of the multiple entries maps a LAN MAC address of a corresponding STA to an AIR MAC address of the corresponding STA. For example, each entry of the LAN MAC-AIR MAC mapping table 208-1 or 208-2 can be a duple that includes two elements: a LAN MAC address and the corresponding AIR MAC address mapped to the LAN MAC address.

In some examples, the LAN MAC-AIR MAC mapping tables 208-1 and 208-2 in the respective APs 202-1 and 202-2 are synchronized with one another (210), i.e., any change of one of the LAN MAC-AIR MAC mapping tables 208-1 and 208-2 is propagated to the other one of the LAN MAC-AIR MAC mapping tables 208-1 and 208-2.

Note that each LAN MAC protected STA (A, B, or C) also can maintain a respective LAN MAC-AIR MAC duple, which includes the LAN MAC address of the AP and the corresponding AIR MAC address mapped to the LAN MAC address.

The following describes an example of data routing in which the LAN MAC protection feature is used.

1. A LAN MAC protected STA discovers and establishes LAN access using a randomized MAC address (AIR MAC address) over the air link to the WLAN 204. When the LAN MAC protected STA establishes a state with the LAN 206, the LAN MAC protected STA uses the randomized MAC address in the IEEE 802.11 header of a data frame to address the frame sent over the air link.

2. The LAN MAC protected STA uses a different MAC address (LAN MAC address), for example its globally unique MAC address or a locally-administered (e.g., IEEE 802.1CQ assigned) MAC address, to communicate over the LAN (wired LAN 206).

3. For unicast traffic (which is traffic transmitted by a transmitting device to an individual target device), the AP 202-1 or 202-2 maintains a mapping of associated STAs (that are associated with the AP) for unicast communications using duples that each includes a corresponding AIR MAC address and the corresponding LAN MAC address. The duples are part of the LAN MAC-AIR MAC mapping table 208-1 or 208-2 noted above. Management traffic between a LAN MAC protected STA and the AP is addressed using the AIR MAC address as the source or destination MAC address. In some examples, there are two mechanisms for handling MAC addressing in the LAN:

(a) The LAN header is tunneled over the air link. The IP stack of the LAN MAC protected STA is bound to the LAN MAC address. Unicast traffic between the AP and the LAN MAC protected STA uses the AIR MAC address.

(b) The LAN MAC protected STA and the AP use the AIR MAC address to communicate over the air link. When the AP receives frames from the LAN MAC protected STA or those that are destined to the LAN MAC protected STA, the AP replaces the AIR MAC address in the frames with the LAN MAC address, and vice versa.

Note: for mechanism (a) above, the existence of an AIR MAC address is completely transparent to the operating system (OS) and upper layer(s) (e.g., an IP stack) of the LAN MAC protected STA or the AP. In addition, conversion between the LAN MAC address and the AIR MAC address (in a duple) is taken care of by a WLAN driver of the LAN MAC protected STA or the AP. A tunnel is established between the LAN MAC protected STA and the AP.

For mechanism (b) above, the duple is known to the OS of the LAN MAC protected STA or the AP, and the OS uses the correct address (AIR MAC address or LAN MAC address) when transmitting a frame.

4. For broadcast/multicast traffic (which is traffic transmitted by a source device to multiple target devices using a group address), uplink traffic (from the LAN MAC protected STA to the AP) is treated as unicast traffic in the manner discussed above. Downlink broadcast/multicast traffic does not make use of the LAN MAC protected STA's MAC address, so the downlink broadcast/multicast traffic is sent in the manner used for legacy devices (with a group address in the header field).

5. During the lifetime of the LAN MAC protected STA's association with the AP, the AIR MAC address may be changed, while the LAN MAC address remains unchanged. This allows seamless connection to the LAN 206 while mitigating observers from tracking the LAN MAC protected STA over long periods.

Management frames are exchanged between the LAN MAC protected STA and the AP using the AIR MAC address, so the wireless communications do not make use of the LAN MAC address. Specifically, the value of any of the 3 or 4 addresses in the 802.11 header is not set to the LAN MAC address in any communication to or from the AP. The LAN MAC address is only exchanged between the AP and STA within encrypted frames (data frames or management frames), using tunneling.

In some examples, the link layer of the AP receives, from a STA, a frame targeting a destination device, translates (using a LAN MAC-AIR MAC mapping table in the AP) an AIR MAC address in the received frame to a corresponding LAN MAC address, and includes the corresponding LAN MAC address in the frame sent to the destination device.

In further examples, the link layer of the AP receives, from a source device, a frame targeting a STA, translates (using the LAN MAC-AIR MAC mapping table in the AP) a LAN MAC address in the frame to a corresponding AIR MAC address, and includes the corresponding AIR MAC address in the frame sent to the STA.

The security association for a STA and an AP is bound to the AIR MAC address when the LAN MAC protection feature is enabled. For example, the device 100 includes a security layer that is part of the protocol stack 110, where the security layer is configured to bind a security association between the device 100 and an AP of the WLAN 204 using the AIR MAC address.

Figure 3:
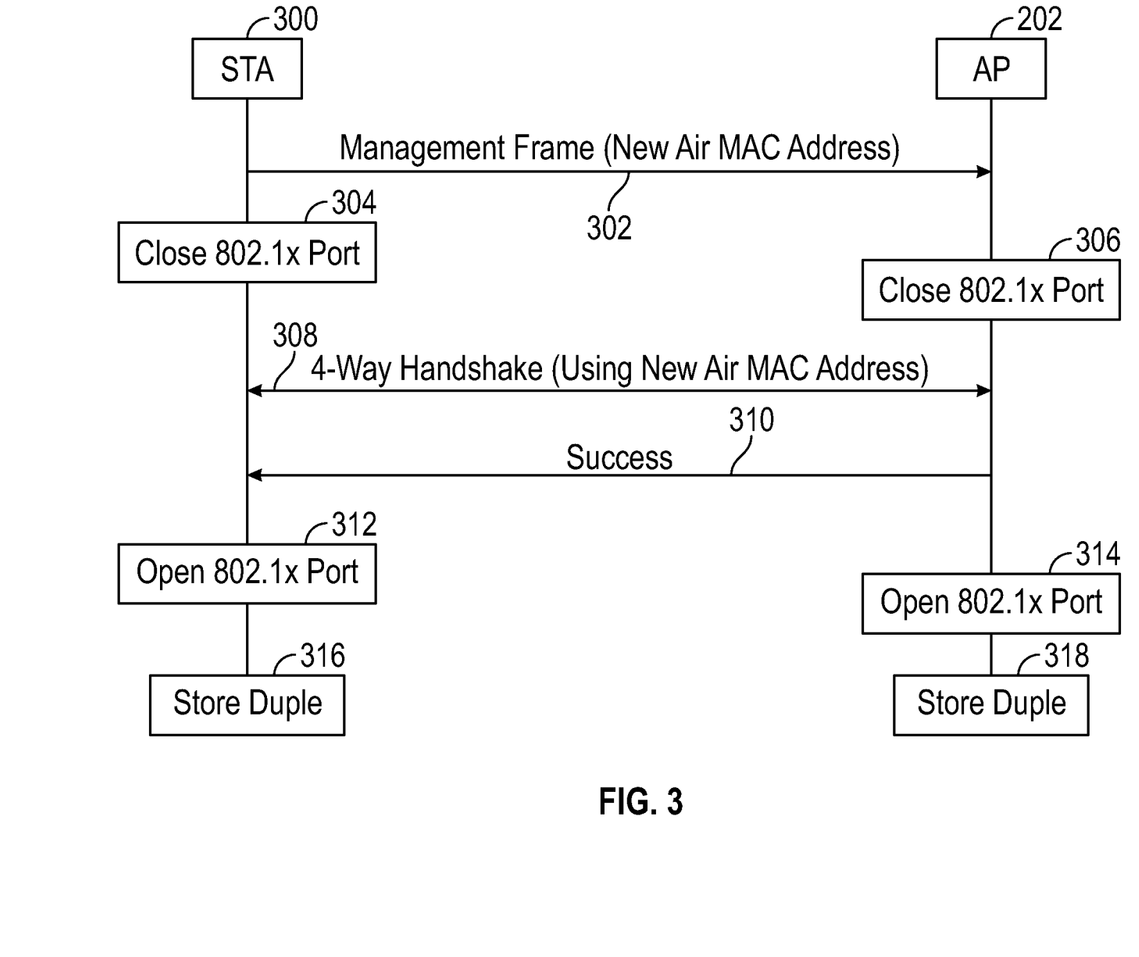
FIG. 3 is a message flow diagram of a process between a STA and an AP, according to some implementations of the present disclosure.

This is consistent with legacy STA behavior. The LAN MAC address protection feature from a security perspective works as follows, as shown in FIG. 3.

A PMK (Pairwise Master Key) and PTK (Pairwise Transient Key) derivation are bound to an AIR MAC address used for initial association to an AP in the WLAN 204, based on a transmission of a management frame (at 302) from a STA 300 (a LAN MAC protected STA) to an AP 202 (one of AP 202-1 or 202-2). The security layer is configured to derive the PMK and the PTK using the AIR MAC address. A security association bound by the security layer of the device 100 with the AP is a PTKSA (PTK security association).

The management frame includes a new AIR MAC address due to a change of the AIR MAC address at the STA 300. Note that even though the change of the AIR MAC address causes a new association (at the link layer 114), a connection or other association at higher layer(s) (116) does not change. The higher layer above the link layer 114 is configured to maintain a connection with the LAN 206 based on the LAN MAC address while the AIR MAC layer address is changed.

In response to the management frame, the STA 300 closes (at 304) an 802.1x port at the STA 300, and the AP 202 closes (at 306) an 802.1x port at the AP 202. Closing an 802.1x port refers to a deletion of a virtual port as specified in IEEE 802.1X.

A 4-way handshake is performed (at 308) between the STA 300 and the AP 202 to establish the association between the STA 300 and the AP 202. In message 4 of the 4-way handshake, the STA 300 encrypts and sends its LAN MAC address to the AP 202 in a Key Descriptor Element (KDE).

When the STA 300 rotates (changes) its AIR MAC address, the STA 300 signals the AP 200 to negotiate a new PTK. The procedure works as follows.

(A) The STA 300 rotates its AIR MAC address and (re-)associates to the AP 202 by signalling a LAN MAC Address Privacy indicator. The STA 300 and the AP 202 negotiate a new PTKSA (pairwise transient key security association) using any of RSNA (robust security network association, SAE (Simultaneous authentication of equals), FT (fast basic service set (BSS) transition), or FILS (fast initial link setup) protocols. During the last message of the 4-way handshake, FT, or FILS exchange, the STA 300 sends the LAN MAC Address in a KDE (key data encapsulation) to the AP 202.

(B) The STA 300 can use an alternative Management Frame to signal negotiation of a new PTKSA. For instance, a SA (security association) Query frame can be modified to trigger the AP 202 to initiate a 4-way handshake to derive a new PTKSA.

When the 4-way handshake is complete (as indicated by a success indication sent (at 310) from the AP 202 to the STA 300), the IEEE 802.1X control port is opened (at 312 and 314, respectively) by the STA 300 and the AP 202, and the STA 300 and the AP 202 each stores (at 316 and 318, respectively) the duple containing the mapped AIR MAC address and the LAN MAC address.

To preserve privacy, additional identifiers may be changed in synchronization with the change of the AIR MAC address. This includes a MAC frame sequence counter, a PHY OFDM (orthogonal frequency-division multiple access) data scrambler, and/or other identifiers.

Rotating a MAC address means to change the MAC address. The changing of the MAC address may employ selection of a random address or a pseudorandom address, or an address selected using another algorithm. The changed MAC addresses do not have to be cyclical. The MAC address change may be negotiated at the time the change occurs, or the MAC address may be determined in such a way that both the AP and the STA can independently calculate what the next AIR MAC address will be.

In some examples, a LAN MAC protected STA advertises its support for the LAN MAC protection feature using an extended capability bit or other indicator.

In some examples, an AP advertises its support for the LAN MAC protection feature using an extended capability bit or other indicator.

In some examples, a LAN MAC protected STA can decide to associate or not to an AP based on the AP's LAN MAC protection capability. The LAN MAC protected STA may be configured in a number of different ways. The LAN MAC protected STA may associate in legacy mode if the AP does not support the LAN MAC protection feature. The LAN MAC protected STA may refrain from associating in legacy mode if the AP does not support the LAN MAC protection feature. The LAN MAC protected may prompt a user before associating in legacy mode.

Use of any of the foregoing may be based on the different user preferences with respect to privacy, and the loss of privacy that using the legacy mode causes. There may also be stored in the LAN MAC protected STA a list of networks that are allowed for legacy mode or not using a white list or black list mechanism.

Similarly, APs may have a policy to allow or disallow STAs from connecting in legacy mode.

The scanning algorithm of the STA may take into account the LAN MAC protection feature and connect to APs supporting the feature at a higher priority than those not supporting it.

3.2 Implementation 2: TDLS

Peer devices would include their LAN MAC Protection element or extended capability bit as part of TDLS (tunneled direct-link setup) link setup and TDLS discovery frames.

TDLS allows direct communication between STAs operating in the same WLAN. Without TDLS, all frames have to be transmitted from the source STA to the AP, and then transmitted from the AP to the destination STA. The TDLS technology allows wireless medium usage to be cut nearly in half by enabling the source STA to transmit directly to the destination STA. The TDLS technology was standardized in the IEEE 802.11z amendment and is tested in a Wi-Fi Alliance certification program since 2012. It is widely deployed in consumer and enterprise WLAN equipment.

In accordance with some implementations of the present disclosure, the initiating TDLS STA includes the LAN MAC Privacy element or capability bit set to a specified value (to indicate support for the LAN MAC protection feature) in a TDLS link setup frame if the STA has associated to the AP with LAN MAC Address Privacy enabled. If the responder STA has associated to the AP with LAN MAC Protection and receives a TDLS link setup frame that includes the LAN MAC Privacy element or capability bit set to a specified value, the responder STA responds by including the LAN MAC Protection element or extended capability in the response. This information allows either TDLS peer to handle teardown of the TDLS link gracefully if the other peer changes its MAC address.

Once the TDLS link setup is successfully completed, the two peer devices would use their AIR MAC addresses to exchange frames. A TDLS link is torn down if one of the peer devices changes its AIR MAC address. The TDLS link is subsequently re-established with the new address after the change.

3.3 Implementation 3: Cryptographic MAC Address

The foregoing refers to rotating the AIR MAC address, changing the AIR MAC address, or choosing a random AIR MAC address. One mechanism to do this is to choose a random MAC address from the local address space, such as a 46-bit number space. This has a very small but non-zero probability of a collision with other devices also choosing addresses randomly. Some standards further divide the local address space into four quadrants of 44 bits each. After a device chooses the new address, the device informs the AP of this new address. This may involve an exchange of management frames. There are other alternative ways choose the new MAC address that use less management frames over the long run.

The use of a cryptographic MAC address can lessen communications associated with negotiating or informing the AP or STA of what the new AIR MAC address will be after the change. A cryptographic sequence, with the sequence and/or seed known only to the AP and the STA, allows the two devices to independently derive the next AIR MAC address in the sequence. This can be implemented by a deterministic pseudorandom number generator. The cryptographic property of this algorithm is such that intermittent passive observers are unable to correlate the old and new addresses, while the AP and the STA each knowing the values can calculate the same next address in the sequence.

3.4 Implementation 4: 802.11be Multi-Link Addresses

This implementation piggybacks on what the current task group IEEE 802.11be is doing for multi-link devices.

IEEE 802.11be, described in "MLA MAC Addresses Considerations," IEEE 802.11-19/1899r7, dated January 2020, proposes techniques or mechanisms for a next generation WLAN. The IEEE 802.11be amendment will define Extreme High Throughput (EHT) PHY and MAC layers capable of supporting a maximum throughput of at least 30 Gbps. The IEEE 802.11be amendment is working on a multiple-link aggregation technology called multi-link device (MLD).

IEEE 802.11be introduces an "MLD address" that is used over the LAN when multiple links are used. The multiple links of a device (such as the device 100) are for associations of the device with respective APs of a wireless network, such as the WLAN 204 of FIG. 2.

The multi-link device concept introduces mapping of individual LINK MAC addresses to the MLD (device) address. In IEEE 802.11be, the individual LINK MAC address would be considered the AIR MAC address, which can be mapped to a LAN MAC address (MLD address) that is not transmitted over the air.

In accordance with some implementations of the present disclosure, authentication and PTK generation is based on the MLD MAC address (LAN MAC address) while only the LINK MAC address(es) (AIR MAC address(es)) are ever used in the SA/TA/RA/DA address fields.

Implementations of the present disclosure introduce changes to the MLD proposal so that the MLD MAC address that is long-lived is protected from eavesdroppers. To do this only the LINK MAC address will ever be visible to observers over the air. Implementations of the present disclosure also add a protocol to enable the LINK MAC address to change during the association without dropping, using techniques similar to those discussed in Section 3.1 above.

Using such a scheme with a LINK MAC address (AIR MAC address) and the MLD address (LAN MAC address) even when the STA is connected over only a single link is an example implementation to provide the LAN MAC protection feature in Section 3.1 above.

More generally, a device can establish associations with multiple APs for multiple links with the APs. A link layer of the device is configured to maintain respective different air link addresses for the multiple links, where the air link addresses are each changeable during a duration of an association.

4. Example Benefits

Implementations of the present disclosure allow for the preservation of user privacy that protects a first link layer address (which remains unchanged during an association of a wireless device with an AP), based on use of a second link layer address that can be changed one or more times during the association. In this manner, the first link layer address does not have to be transmitted over the air in unencrypted form, such as in an IEEE 802.11 MAC header. Instead, the unencrypted IEEE 802.11 MAC header contains the second link layer address, while the first link layer address can be tunneled (and encrypted) as payload in the frame that includes the IEEE 802.11 MAC header.

For example, a benefit of using a MAC address in the local address space and not using a globally assigned MAC address for all WLAN traffic is that it prevents tracking over long time periods. In the case where the tracking adversary is a passive observer, it prevents tracking across different locations as most implementations randomize the address used in scanning operations and use a different address per SSID when associating with the network. In some cases the MAC address changing implementation also provides privacy from the network provider as well.

A storage medium (e.g., 108 in FIG. 1) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory or other type of non-volatile memory device; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:
1. A device comprising:
a link layer comprising a hardware processing circuit and configured to:
receive, in information transmitted by an access point (AP) in a wireless network, an indication that the AP supports a link layer address protection feature that provides for use of different link layer addresses,
use the different link layer addresses comprising a first link layer address and a second link layer address,
maintain the first link layer address unchanged for a duration of an association of the device with the wireless network, and
change the second link layer address from a first value to a second value during the duration.

2. The device of claim 1, wherein the association is with the AP, and the link layer is configured to:
establish a plurality of links with respective APs of the wireless network, wherein the second link layer address is for a first link of the plurality of links, and
maintain a third link layer address for a second link of the plurality of links, wherein the third link layer address is changeable during a duration of an association by the device with another AP.

3. The device of claim 2, wherein the first link layer address is a multi-link device (MLD) address, and the second link layer address and the third link layer address are part of a plurality of link layer addresses for respective links of the plurality of links between the device and the respective APs.

4. The device of claim 1, wherein the first link layer address is a first Media Access Control (MAC) address, and the second link layer address is a second MAC address.

5. The device of claim 1, wherein the link layer is configured to include the first link layer address in a data frame destined to a wired network.

6. The device of claim 1, wherein the link layer is configured to include the first link layer address in a management frame transmitted to the AP.

7. The device of claim 1, further comprising:
a processor configured to:
send an address resolution request to the AP, and
receive, by the device from the AP in response to the address resolution request, the first link layer address and the second link layer address.

8. The device of claim 1, wherein the second link layer address is a randomized address.

9. The device of claim 1, wherein the second link layer address is a cryptographic address that is independently derivable at the device and the AP.

10. The device of claim 1, wherein the link layer is configured to tunnel a local area network (LAN) header containing the first link layer address in a payload of a data frame comprising a header containing the second link layer address.

11. The device of claim 1, comprising:
a further layer above the link layer, the further layer configured to maintain a connection with a local area network (LAN) based on the first link layer address while the second link layer address is changed.

12. The device of claim 1, comprising:
a security layer configured to bind a security association between the device and the AP using the second link layer address.

13. The device of claim 12, wherein the security layer is configured to derive a pairwise master key (PMK) and a pairwise transient key (PTK) using the second link layer address, and wherein the security association is a PTK security association (PTKSA).

14. The device of claim 13, wherein the security layer is configured to negotiate a new PTK in response to the change of the second link layer address.

15. The device of claim 1, wherein the link layer is configured to send an indication to the AP to request information regarding whether the AP supports the link layer address protection feature.

16. The device of claim 1, wherein the link layer is configured to perform a tunneled direct link setup (TDLS) with a peer device to establish a direct wireless link between the device and the peer device, the TDLS comprising the link layer sending an indication of support for the link layer address protection feature to the peer device.

17. The device of claim 16, wherein the link layer is configured to send a frame, using the second link layer address, to the peer device.

18. An access point (AP) for a wireless network, comprising:
a link layer comprising a hardware processing circuit and configured to:
transmit, over the wireless network to a device, an indication of support for a link layer address protection feature that provides multiple link layer addresses, the multiple link layer addresses comprising a first link layer address to be maintained unchanged for a duration of an association between the device and the AP, and a second link layer address to be varied to different values during the duration.

19. The AP of claim 18, wherein the link layer is configured to:
receive, from the device over the wireless network, an address resolution request, and
send, to the device in response to the address resolution request, the first link layer address and the second link layer address.

20. The AP of claim 18, wherein the link layer is configured to:
receive, from a second device over a wired local area network (LAN), a second address resolution request, and
send, to the second device in response to the second address resolution request, a third link layer address that is maintained unchanged for a duration of an association between the second device and the AP.

21. The AP of claim 18, wherein the link layer is configured to maintain a mapping that maps the first link layer address to the second link layer address.

22. The AP of claim 21, wherein the link layer is configured to:
receive, from the device, a frame targeting a destination device,
translate the second link layer address in the frame to the first link layer address, and
include the first link layer address in the frame sent to the destination device.

23. The AP of claim 21, wherein the link layer is configured to:
receive, from a source device, a frame targeting the device,
translate the first link layer address in the frame to the second link layer address, and
include the second link layer address in the frame sent to the device.

24. A non-transitory machine-readable storage medium comprising instructions that upon execution cause a device to:
receive, in information transmitted by an access point (AP) in a wireless network, an indication that the AP supports a link layer address protection feature that provides for use of different link layer addresses;
use, at a link layer of the device, the different link layer addresses comprising a first link layer address and a second link layer address,
maintain the first link layer address unchanged for a duration of an association of the device with a wireless network, and
change the second link layer address from a first value to a second value during the duration.

25. The non-transitory machine-readable storage medium of claim 24, wherein the second link layer address is a randomized address or a cryptographic address.

* * * * *